April 6, 1965  A. I. APPLETON  3,176,968
PORTABLE FOOD MIXER
Original Filed June 28, 1956  5 Sheets-Sheet 1
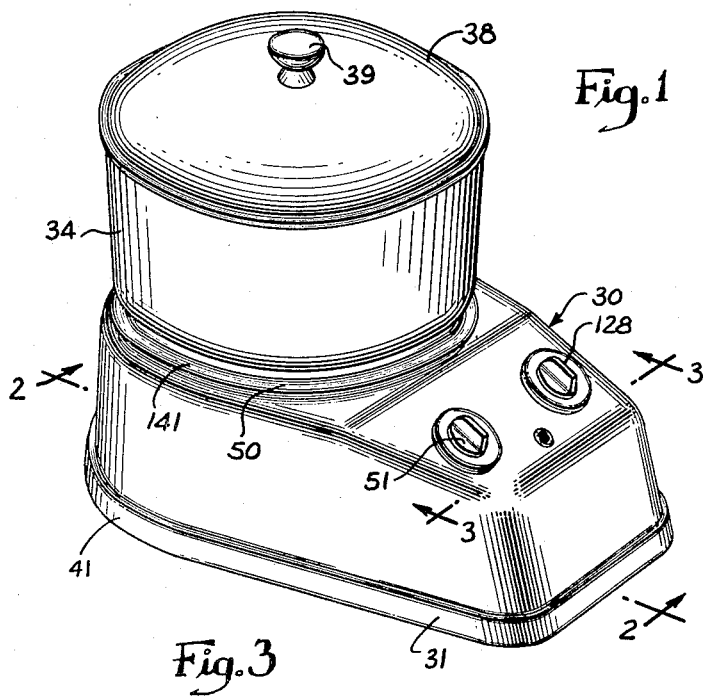
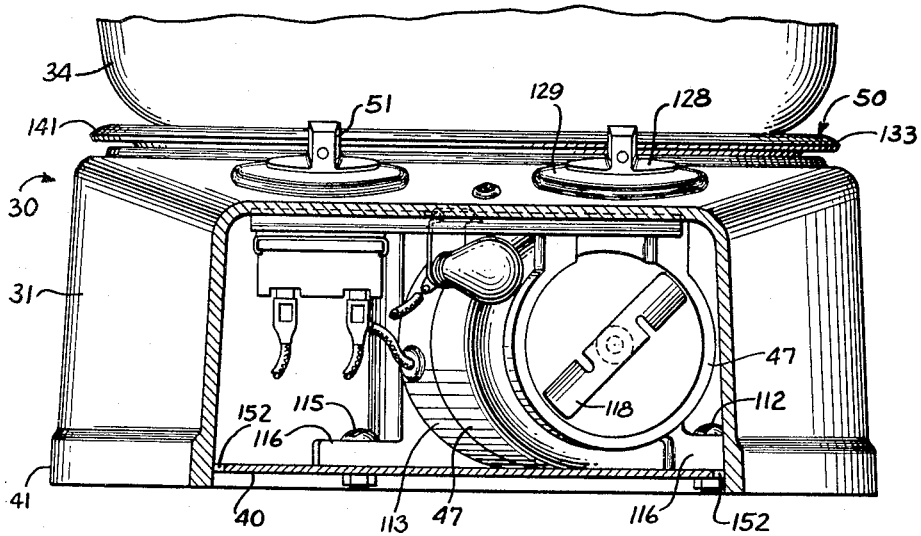
Inventor
ARTHUR I. APPLETON
by: Wolfe, Hubbard, Voit & Osann
attys.

April 6, 1965  A. I. APPLETON  3,176,968
PORTABLE FOOD MIXER
Original Filed June 28, 1956  5 Sheets-Sheet 2
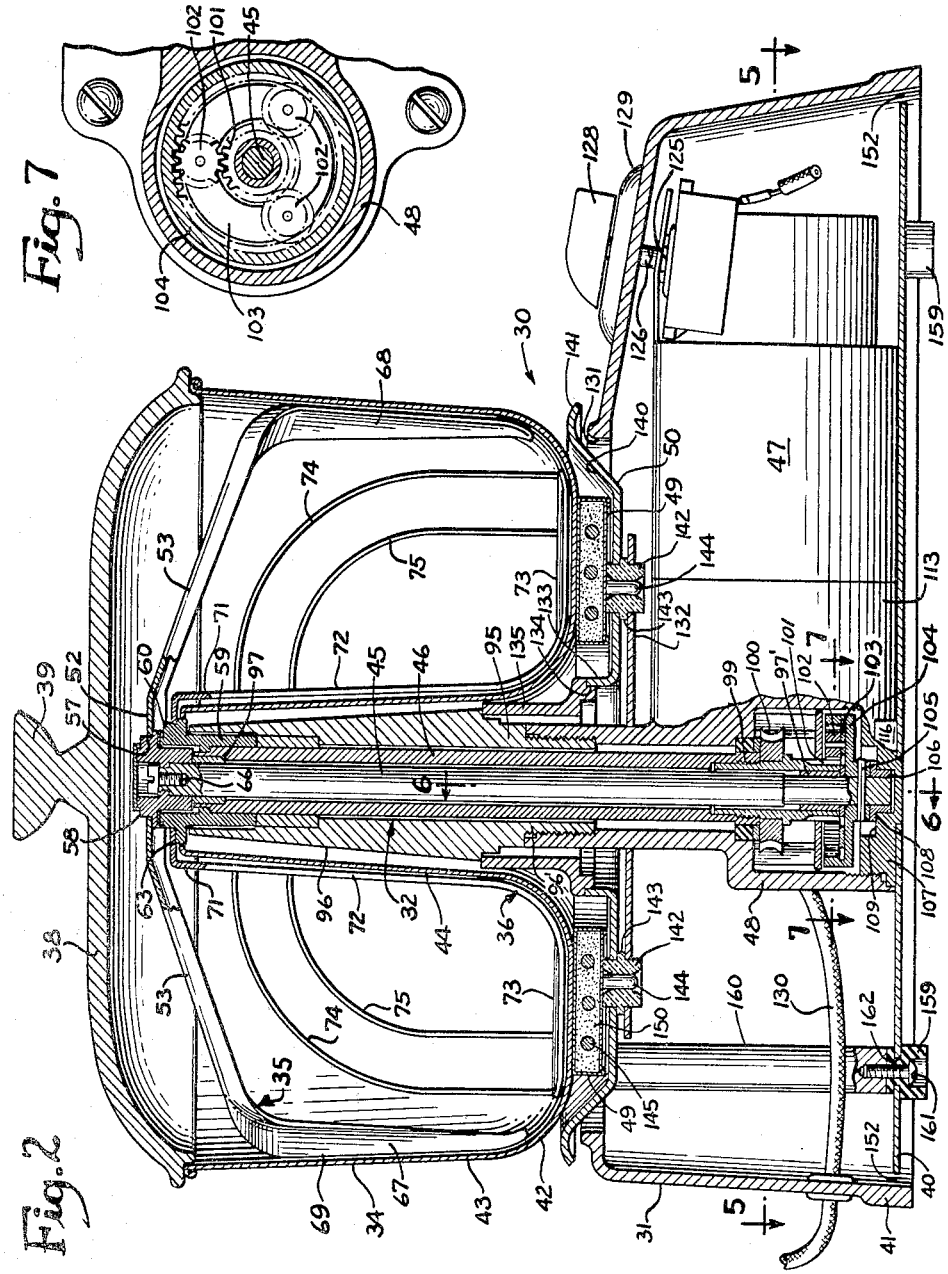
Inventor
ARTHUR I. APPLETON
by: Wolfe, Hubbard, Voit & Osann
Attys.

April 6, 1965  A. I. APPLETON  3,176,968
PORTABLE FOOD MIXER
Original Filed June 28, 1956  5 Sheets-Sheet 3

Inventor
ARTHUR I. APPLETON
by: Wolfe, Hubbard, Voit & Osann  Attys.

April 6, 1965 A. I. APPLETON 3,176,968
PORTABLE FOOD MIXER
Original Filed June 28, 1956 5 Sheets-Sheet 4
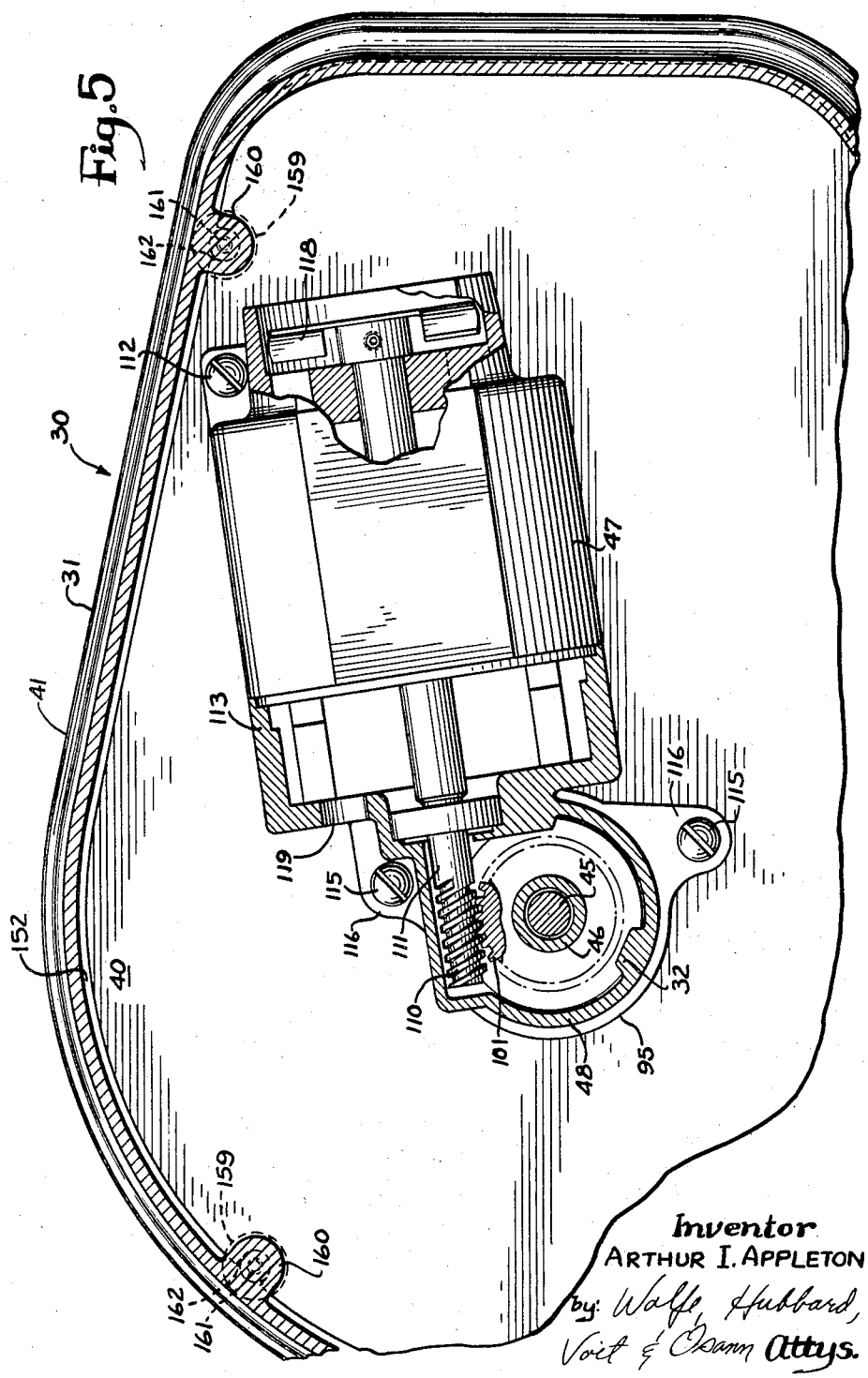
Inventor
ARTHUR I. APPLETON
by Wolfe, Hubbard,
Voit & Osann Attys.

April 6, 1965 A. I. APPLETON 3,176,968
PORTABLE FOOD MIXER
Original Filed June 28, 1956 5 Sheets-Sheet 5
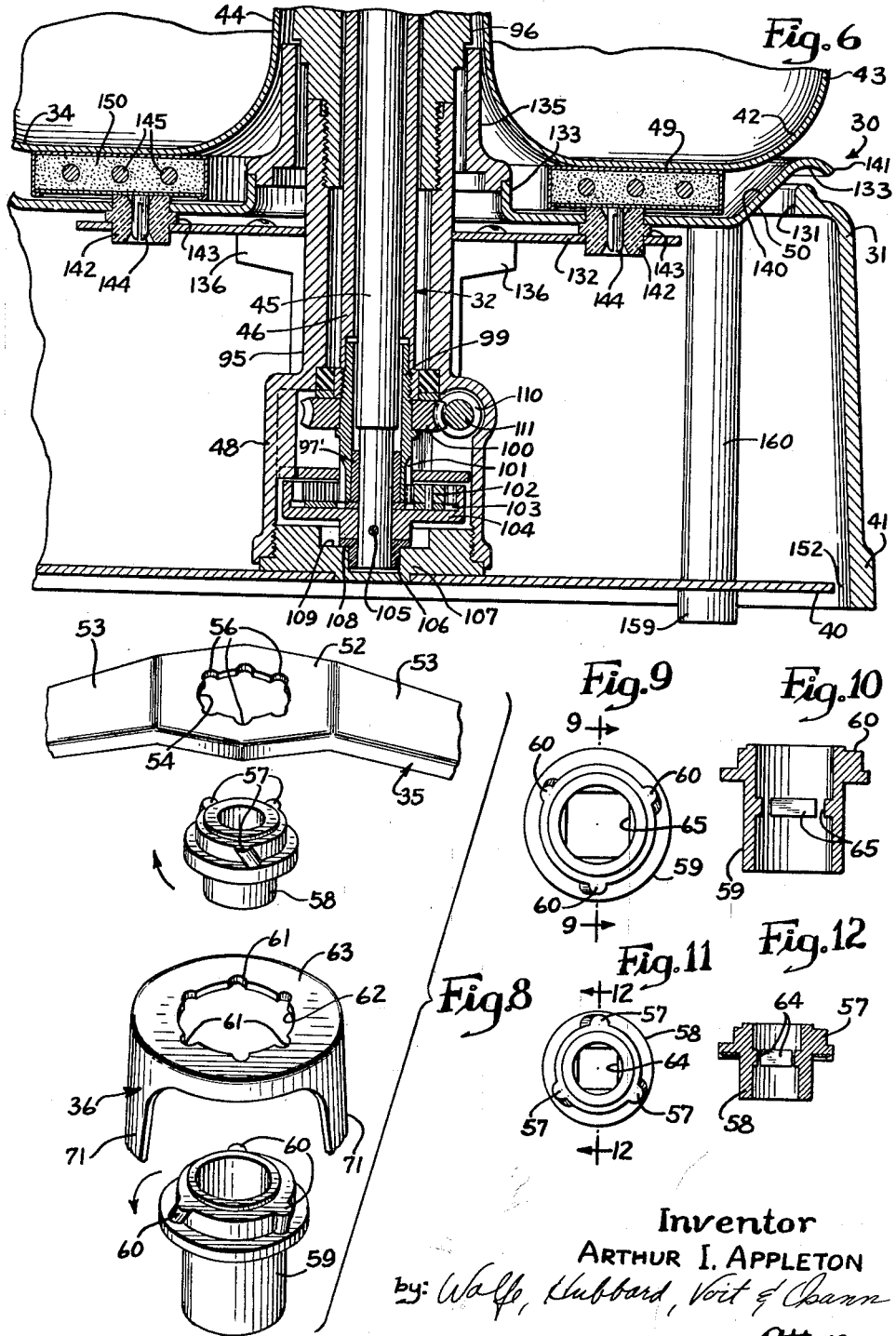
Inventor
ARTHUR I. APPLETON
by: Wolfe, Hubbard, Voit & Osann
attys.

3,176,968
PORTABLE FOOD MIXER
Arthur I. Appleton, 1713 Wellington, Northbrook 13, Ill.
Original application June 28, 1956, Ser. No. 594,574, now Patent No. 2,905,452, dated Sept. 22, 1959. Divided and this application Apr. 29, 1959, Ser. No. 809,687
6 Claims. (Cl. 259—108)

This application is a division of my copending application Serial No. 594,574, filed June 28, 1956, now Patent No. 2,905,452, which is a continuation-in-part of my prior application Serial No. 256,066, filed November 13, 1951, covering a Mixer, now abandoned.

The present invention pertains generally to mixing apparatus and, more specifically, to a novel, power-operated device for mixing various fluid, solid and pulverous materials. It finds particular, but by no means exclusive, utility when embodied in a household appliance for mixing foods. The invention is, however, adapted to serve with equal facility in commercial or industrial applications for mixing other substances as well as foods.

One object is to provide a mixer of the type set forth and which will include a controllable heating means, adapting the device for use in delicate cooking operations, such as the making of certain frostings, and also permitting the device to be used for direct cooking of one or more of the ingredients to be mixed or beaten.

Still another object is to provide an appliance of the foregoing type having a particularly attractive appearance and which, when idle, will be completely closed so as to eliminate the necessity for a plastic dust cover.

Other objects and advantages will become apparent as the following description proceeds, taken in connection with the accompanying drawings, in which:

FIGURE 1 is a perspective view of an illustrative mixer embodying the present invention;

FIG. 2 is an enlarged, vertical sectional view taken through the longitudinal medial plane 2—2 of the mixer shown in FIG. 1;

FIG. 3 is an enlarged, vertical sectional view taken through the plane of lines 3—3 of FIG. 1;

FIG. 5 is an enlarged, horizontal sectional view taken through the plane of lines 5—5 of FIG. 2;

FIG. 6 is an enlarged, vertical sectional view taken through the plane of lines 6—6 of FIG. 2;

FIG. 7 is an enlarged, fragmentary, horizontal sectional view through the plane of lines 7—7 of FIG. 2, and illustrating the planetary gear drive;

FIG. 8 is an enlarged, exploded perspective view of the power head and beater coupling arrangement embodied in the mixer of FIG. 2; and FIGS. 9–12 are sectional views taken through the planes of lines 9—9, 10—10, 11—11, and 12—12, respectively, of FIG. 8.

Figure 4:
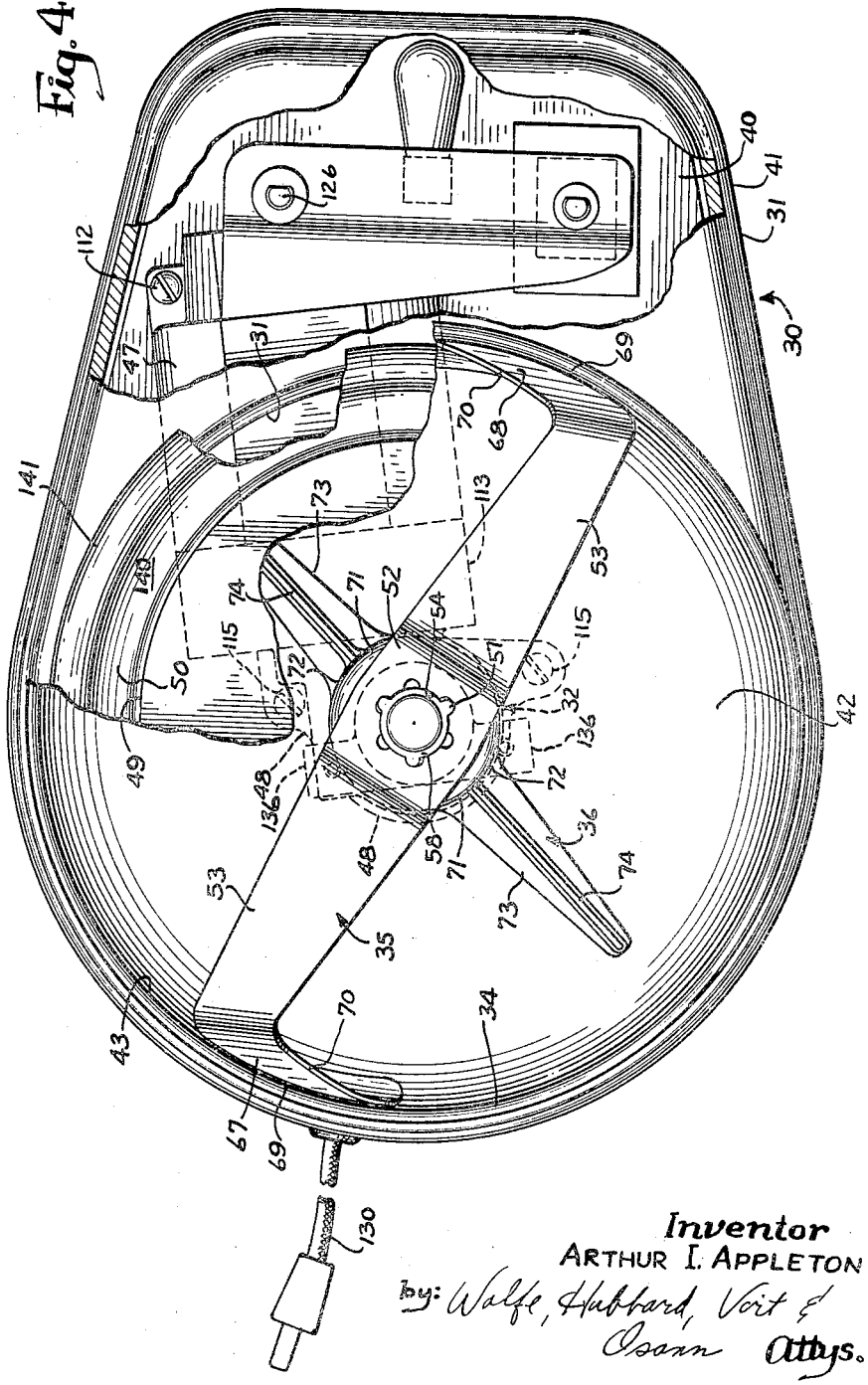
FIG. 4 is a fragmentary plan view of the mixer as shown in FIGURE 1, certain portions of the casing being broken away to illustrate internal details.

While the invention is susceptible of various modifications and alternative constructions, an illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

*General organization*

Referring more specifically to the drawings, the invention is there exemplified in a novel mixing device which, in this instance, is a household food mixer 30. In general, the mixer 30 comprises a base 31 having an upstanding power head 32, a mixing bowl 34 which telescopes over the power head, and a pair of counter-rotating impellers 35, 36 drivingly supported from the power head 32. For purposes of description, the impeller 35 will be referred to herein as the upper impeller while the impeller 36 will be called the lower impeller (see FIG. 3). The bowl 34 is equipped with a cover 38, which may be of transparent material, having a center handle 39.

The base 31 of the illustrative mixer 30 is assembled upon a bed 40 (FIG. 2) having feet of rubber or similar material to prevent sliding of the mixer on the counter, table top, or other horizontal surface which supports it. The bed 40 is surmounted by a hood or casing with sloping side walls extending upwardly from a peripheral flange 41 and curving gracefully into a top wall. The casing may, for example, be of stamped sheet metal, cast light metal, or molded plastic material, securely fastened to the bed 40. The side walls of the casing may also have external embossments or ribs to serve as stiffeners and enhance its appearance.

The mixing bowl 34 in its preferred form, has a substantially annular shape and may be constructed from a wide variety of materials including aluminum, stainless steel and glass. In the present instance, the bowl 34 comprises a dished or concave bottom 42 merging into an outer side wall 43 which has a slight outward and upward taper, terminating in a peripheral rim adapted to register with the rim of the cover 38. The bowl bottom 42 also merges with a hollow central boss 44, flared out at its base and tapered toward its upper or free end which is situated at or near the top of the bowl 34. The internal contour of the boss 44 is complementary with the exterior contour of the power head 32. These parts are so proportioned that the bowl boss can be centered on, and telescoped over, the power head 32 with the bottom of the bowl resting upon the top of the base casing 31.

Turning next to the counter-rotating impellers 35, 36, it will be perceived that the same have been constructed and arranged to sweep the entire normally usable volume of the mixing bowl 34. By "normally usable volume" is meant the maximum volume at which a user would ordinarily fill the bowl while still permitting the same to be handled conveniently and without likelihood of spillage. By the same token, the impellers 35, 36 have been constructed and arranged to sweep exceptionally close to substantially the entire inside wall surface of the bowl 34 included within the normally usable volume of the same. This avoids the building up of accumulations of unmixed or poorly mixed substances on the bowl walls and insures a maximum yield of properly mixed materials from the bowl.

In the present instance, the top impeller 35 is driven in a clockwise direction (as viewed from the top in FIG. 4) while the bottom impeller 36 is driven in a counterclockwise direction (also as viewed from the top). Since each impeller is formed with a pair of diametrically opposed positions, this means that each impeller sweeps past the other twice per relative revolution. While it is possible to operate the impellers 35, 36 at various individual rotational speeds, it has been found desirable to proportion each impeller and to select its driving speed so that the opposed bowl reactions or bowl drags due to the counter-rotation of the impellers will balance out approximately, thus avoiding a tendency toward rotation of the bowl 34 about the power head 32. This balanced condition can readily be determined in the laboratory by loading the bowl with extremely heavy or viscous materials and by varying the individual speeds of the impellers until the bowl no longer tends to turn. An unbalanced bowl reaction may, of course, be dealt with by the straight forward expedient of utilizing a keyed or splined connection between the hollow bowl boss 44 and the power head 32.

The power head 32 includes concentrically mounted and counter-rotating impeller drive shafts 45, 46 powered by a motor 47 mounted within the interior of the mixer base 31 and coupled to the concentric shafts by means of a transmission disposed within a gear housing 48.

To complete the description of the general organization and arrangement, beneath the annular mixing bowl 34 for heating the contents, and on the top of the mixer base 31 is an annular heating element 49 supported by a saucer-like pan or baffle plate 50 mounted upon a plurality of insulating buttons spacing the baffle plate 50 from the mixer base. The heating element is connected by means of a power cord to a source of electric current, and may be regulated by means of a switch 51 controlling a rheostat or the like, as shown in FIGURE 1 carried on the top of the mixer base.

Impeller construction

Turning first to the construction of the impellers shown in FIGS. 2 through 12, two individual impellers 35, 36 are employed.

These individual impellers together make up an assembly including the top impeller 35, which comprises a central hub 52 (FIGS. 2, 4 and 8) with a substantially flat contour and merging into opposed outwardly extending arms 53. The central hub of the impeller has (FIGS. 8–12) a generally circular opening 54 adapted to fit about the upper end of the impeller drive shaft. The side wall of the opening 54 is formed with equally spaced, in the present instance six, substantially vertical slots or grooves 56 for coupling with a plurality, shown as three, inclined or helical driving lands 57 carried on the outer peripheral surface of a bushing 58 non-rotatably fixed to the inner beater drive shaft 45 of the power head 32. In the illustrative form of drive shown, these inclined or helical driving lands 57 are angled to slope upwardly in the direction of beater rotation. They, in combination with the slots 56 in the opening through the impeller hub, constitute not only a toothed drive to turn the impeller, but additionally obtain the result of positively locking the impeller to the drive shaft while the shaft is rotating. When the drive shaft is stopped, the impeller may easily be removed by lifting the impeller directly, giving it a slight twist in the direction of rotation to separate the elements, or by lifting the bowl, as an incident to which the impellers are lifted off the drive shafts.

The lower or bottom impeller 36 is coupled to be driven to the outer impeller drive shaft 46 of the power head 32 in a like fashion. In this case, a sleeve or bushing 59 is mounted on the upper end of this inner drive shaft, presenting helical or inclined lands 60 on the peripheral surface, seated within slots 61 formed in the side wall of a substantially central opening 62 machined in the hub 63 of this bottom impeller. Again, the lands 60 slope upwardly in the direction of beater rotation, being of the opposite "hand" to the lands 57 driving the top beater 35 since the beaters or impellers counter-rotate.

For convenience in fastening the bushings 58, 59 on the impeller drive shafts 45, 46 respectively, the upper ends of these shafts are formed square and are received within substantially square openings 64, 65 in the upper and lower bushings 58, 59 respectively, although it will be understood that this particular arrangement may be modified if found desirable. To hold the said upper and lower bushings in place, a cap screw 66 may be employed, threaded into the inner shaft 45 and thus holding the bushings in permanent assembled relation.

It will also be observed that the upper sleeve or bushing 58 when in place on the inner drive shaft 45 serves as a pilot to guide the inner or lower impeller 36 toward toothed engagement with the driving element therefor presented by the lower bushing 59 on the outer impeller drive shaft 46. This pilot effect facilitates placing the lower impeller properly located and in driving relation on the outer drive shaft.

Affixed to, and preferably integral with the opposed outwardly extending arms of the top impeller 35, are drooping blade portions 67, 68 bent to depend in substantially straight relation with the outer side wall of the mixing bowl, the leading edge 69 of the depending portion being substantially straight and located spaced but a short distance throughout its length from the inside of the bowl side wall, while the trailing edge 70 is spaced a larger distance to pitch the blade for deflecting material inwardly.

The lower ends of the depending blades 67, 68 of this upper or top impeller 35, curve inwardly slightly generally following the curvature of the dished bowl bottom.

The lower or bottom impeller 36 nests with the upper impeller and is supported for driving relation by the outer drive shaft 46 of the power head 32 centrally disposed within the mixing bowl. This bottom impeller, has a central hub 63 of substantially cylindrical shape within which the slotted opening 62 constituting one element of the toothed drive is fashioned. Extending downwardly from the under face of this central hub 63, and fixed integrally throughout are a pair of diametrically opposed arms 71 each defining an inner blade 72 (FIG. 2) which merges into a bottom blade 73. As shown in FIGS. 2 and 4, the inner and bottom blades are slightly curved to conform to the tapered central boss of the mixing bowl in the case of the inner blades, for increased mixing efficiency, in the case of the bottom blades for the latter reason alone. Thus the inner blades are adapted to nest closely along the central boss of the bowl.

This lower impeller 36 also has, in the illustrative form shown in FIG. 2, a section adapted to sweep through the intermediate portion of the contents within the bowl. Accordingly, each of the opposed inner blades 72 of the lower impeller carries a pair of outwardly extending and downwardly curving impeller elements 74, 75 spaced uniformly apart and joining the bottom blades 73 adjacent the ends. These impeller elements may be constructed of flat rigid strips of the same material from which the blades themselves are fashioned, brazed or otherwise secured in place on the inner impeller, to occupy an intermediate position in the bowl cross section. In one sense, the impeller elements 74, 75 may be said to pass between the inner blades of the lower impeller 36 and the downwardly depending and outer blades or blade sections 67, 68 of the top impeller 35. Thus upon counter-rotation of the upper and lower impellers, it will be perceived that the upper impeller tends to deflect material inwardly as the result of the slight pitch of the depending blade sections, while the lower impeller tends to deflect material outwardly from the tapered central boss of the mixing bowl, and as well upwardly from the bottom of the bowl, this same lower impeller also carrying the impeller elements for sweeping through, agitating and mixing the contents in the intermediate sections of the bowl. The counter-rotating impellers pass with respect to the other setting up a plurality of currents in the mix, including some toward the center of the bowl, some away from the center of the bowl, some toward the bottom of the bowl and some away from the bottom of the bowl.

Power head and transmission

For driving as well as supporting the impellers 35, 36 (FIGS. 1–12), the present invention contemplates the use of an upstanding column 32 within which are journalled the pair of counter-rotating concentric impeller drive shafts 45, 46. The shaft 45, which is the inside shaft, is journalled within the outside shaft 46 by means of bearings 97, 97' one near the upper and the other near the lower end of this outside shaft.

The outside shaft 46, on the other hand, is journalled within a centering cone 96 which may be built up out of plastic, metal, or hard rubber material, and has a tapered stepped section 96' toward the lower end, externally threaded for securing within the upper end of a gear housing 48 or the like enclosing the impeller drive shafts' transmission or gear drive assembly.

The taper of the centering cone 96 is preferably complemental to that of the inside of the mixing bowl boss, so that the cone is adapted to serve as a centering means for the bowl. The upper ends of the drive shafts 45, 46 are each provided, as has hereinbefore been described in detail, such that the impellers may be instantaneously detached from these drive shafts, either individually or as an incident to lifting the bowl off the mixer base. The arrangement also serves to enable the impellers to be connected to their drive shafts with utmost ease and speed.

In the present instance, the outer drive shaft 46 is turned directly by the motor 47, and by means of a planetary drive means contained within the housing 48, counter-rotation is imparted therefrom to the inside shaft 45. The outside shaft 46, thus is journalled within the centering cone 96, and is connected by means such as threads or the like, at its lower end, with a sleeve 99 machined to receive a worm wheel 100. This sleeve 99 at its very lower end is milled with outwardly extending gear teeth forming a sun gear 101. The outer concentric shaft 46, sleeve, worm wheel and sun gear assembly, nest within a planetary gear array 102, the downward thrust on the shaft 46 being taken up as by means of a lower gear disc 103 supported within an internal ring gear housing 104 pinned (as by a pin 105) to the inner impeller drive shaft 45. The internal ring gear housing 104 is constructed to present a lower stepped section, seating within a recess 106 formed in the housing cover 107 closing the transmission or drive gear housing 48. The shoulders 108 presented by the lower stepped bearing surrounding the inner drive shaft 45, serve to take up downward thrust on this shaft, bearing against a horizontal annular bearing seat 109 provided laterally of the recess 106 within the housing cover.

The sun gear 101 drives, as shown in FIG. 7, the assembly of planet gears 102, which through the internal ring gear housing 104 imparts rotation in a counter-direction to that of the sun gear, to the inner impeller drive shaft 45. Speed reduction of this inner shaft is also effected by the transmission shown in the drawings, the particular speed ratio being somewhat a matter of choice as hereinbefore described.

It has been found relatively simple with this transmission to obtain improved mixing action with the counter-rotating beaters by selecting a speed ratio at which the points where the oppositely moving beaters pass, constantly rotate but slowly about the power head. If the speed ratio between the outer and inner impeller drive shafts is a whole number, the points at which the blades pass will remain stationary within the mixing bowl. If on the other hand, the speed ratio is some fractional number, these points will move constantly about the power head in one direction or the other, depending upon the particular speed ratio. It has been found that a slow rate of travel of these points uniformly in one direction produces an improved mixing action.

Counter-rotation of the shafts 45, 46 is effected by means of the worm wheel, sun gear and planetary gear drive contained within the transmission housing 48. In the present instance the worm wheel 100 is driven by means of a worm gear 110 carried by a motor shaft 111 powered by the motor 47 supported within the interior of the base 31 of the mixer.

Referring to FIGS. 5 and 6 more particularly, in the present instance the motor 47 is fastened, as by bolts 112, to a mounting bracket which is affixed to the bed 40. The worm and worm gear comprise a primary speed reduction means and may be encased within the transmission housing 48 and the motor housing 113, which latter housing may be cast or otherwise formed as a part separate from the transmission housing 48, or made integrally therewith. In either event, the transmission housing 48 is fastened as by means of bolts 115 through feet 116, to the bed 40, to provide a firm and stable structure for mounting the power head and the motor within the base 31 of the mixer. Within the motor housing 113, the motor 47 is mounted for rotation, commonly an electric drive motor of the Universal type, and is equipped with a cooling fan 118 at the motor shaft end remote from the worm gear 110. The motor housing has openings such as 119 for the passage of air through and by the motor windings. The motor fan 118, thus causes a constant movement of air through the interior of the mixer base 31, this constant movement or circulation of air having for a first purpose, the cooling of the motor 47.

For driving the impellers 35, 36 at selectively variable speeds corresponding to the requirements for the substances being mixed in the bowl 34, the motor 47 may be equipped with an adjustable governor 125. While the present invention is not particularly concerned with the details of the governor, it might be noted that, in this instance, the governor is constructed as a component part of the motor assembly and is provided with an upstanding adjusting stem 126 terminating at its upper end in a speed control dial, which is actually a calibrated manual adjusting dial 128. To preclude spilled material from entering the casing via the opening through which the adjusting stem 126 extends, the top wall of the casing has an embossment or raised island 129 formed therein and disposed in underlying relation with the speed control dial 128. Power for the motor 102 may be supplied as by means of a power supply cord 130 which enters the back wall of the casing or base 31 of the mixer.

*Mixer bowl heating*

In order to broaden the utility of the mixer 30, provision is made to adapt the same for use in even the most delicate cooking operations and also for direct cooking or warming of one or more of the ingredients to be mixed or beaten. This is accomplished by equipping the mixer with a controllable heating means, such as a tubular or annular heating element 49 of the type sometimes referred to as a "Calrod" unit.

Accordingly, the top wall of the mixer base is cut away to form a generally circular opening 131. Within this opening and mounted by means of a mounting plate 132, a saucer-like pan or baffle plate 50 is carried spaced from the mixer base to provide a troughed annular section constituting a support means for the annular heating element 49. In the present instance, for the purpose of lending rigidity to the structure, the baffle plate in the central portion thereof is formed with a turned up central rim 133 which is press-fit onto an indexing collar 135. The collar 135 in turn fits comparatively snugly within a groove formed about the outside of the centering cone 96.

The mounting plate 132, as mentioned before, constituting the mount for the baffle plate 50, is carried on the upper flat surfaces presented by oppositely disposed vertical ribs 136, formed as shown, integral with the transmission housing (48) casting. These ribs 136 laterally projecting and rigid (FIG. 4) form a stable and firm support for the mounting plate 132 and likewise the baffle plate 50.

The baffle plate 50 is provided toward its outer edge with a section bent to slope gently upwardly and presenting a substantially flat annular part 140 and at its very outer periphery with a reverse curved section or downwardly turned rim 141. The relative size of the opening 131 in the base of the mixer and the baffle plate 50, is such as to provide for substantial clearance between the opening and the plate. Thus the baffle plate is supported level by means of the mounting plate 132, on a plurality of insulating buttons 142, these insulating buttons also serving to mount the annular heating element 49 itself. In the present instance, each of these buttons 142 is made of bonded mica, and is generally cylindrical in shape with a raised shoulder 143 substantially centrally thereof, the opposed cylindrical end portions of each of the buttons being received in like sized alined openings cut in the baffle plate 50 and mounting plate 132. The shoulder 143 serves as a spacer separating the mounting and baffle plates. For securing the heating element 49 within the troughed annular section of the baffle plate 50, the heating element shell on the under side has secured to it a plurality of downwardly extending split pins 144 sized to fit snugly within a central cylindrical bore in the mica insulating buttons 142. For facilitating entry of the pins in the bores, the upper and lower ends of the bores (the button is reversible) are chamfered. In this case, frictional engagement of the pins 144 within the openings in the insulating buttons 142, holds the pins against endwise movement, and thus the heating unit 49 in place. Nevertheless it is relatively simple to remove the heating unit, which may be done by forcing the pins from the insulating buttons.

The heating unit, as described hereinbefore, is of conventional construction, including a circular array of solid-conductor heating wires 145, surrounded by insulating material 150 within a steel, or other like material, shell. For convenience, the heating unit may be connected through the same power cord 130 providing current for the mixer drive motor 47, but for regulating the heat output it is preferable to connect the unit to the source of current through a variable rheostat or the like, controlled by an adjusting dial 51, for regulating the current supplied to the heating unit and thus the heat developed.

The saucer-like pan or baffle plate 50 not only supports the heating unit 49, but also forms a base with the said heating element for supporting the mixing bowl 34. In addition, the baffle plate 50 functions to reflect heat upwardly toward the mixing bowl, focusing of the heat being aided by the flat upwardly sloping section 140 and rim 141 on the outer edge of the baffle plate.

This same downwardly turned rim also functions to deflect downwardly and away from the bowl, air moving by convection through the gap between the under side of the baffle plate and the edge of the opening 131 within the base of the mixer. As has been described hereinbefore, air is constantly being circulated within the interior of the base of the mixer by the motor fan, this movement of air and circulation of warm currents of air through the housing creating temperature differential between various points in the housing and resulting in the development of convection air currents. One such series of curing contents within the mixing bowl. Since heat is transmitted to the baffle plate 50, which is transmitted directly to the air immediately adjacent the under surface of this plate, the layer of air under the baffle plate being warmer than the surrounding air tends to flow outwardly toward the gap between the baffle plate and the opening in the mixer base. This movement of air may be observed as constant, flowing upwardly through the space or gap and being directed downwardly and away from the mixing bowl by the concave curved under surface of the baffle plate rim itself.

This constant circulation of air through the gap between the baffle plate 50 and mixer base opening 131, also serves to insulate the mixer base housing or casing walls from heat generated by the heating unit. In other words, the material of the base of the mixer being plastic, metal or the like, if subjected to excessive heat from the heating unit may warp or be stressed, becoming too hot to touch, or in the case of plastic, bending and deforming in an undesirable manner. The constant circulation of air and the movement of air through the gap between the baffle plate 50 and the mixer base by convection air currents, reduces the heat transferred to the mixer base substantially. Furthermore, the heating element is located about the central power head and passes over the motor 47 supported within the base of the mixer. Heat generated in the heating element and transferred by conduction, radiation or convection downwardly affects the temperature of air surrounding the motor. By use of the convection currents causing the constant flow of air beneath the pan or baffle plate 50, the motor is insulated from the heating unit.

The heating unit 49 is thus enabled to operate for extended periods for the generation of heat and heating contents within the mixer bowl, without deleteriously affecting the operation of the drive motor for the power head of the mixer, or raising dangerously the temperature of the walls of the mixer base.

Further facilitating the circulation of air within the mixer base 31, and furnishing a source of cooling air, is accomplished by a relatively narrow air gap or spacing 152 between the peripheral edge of the bed 40 of the mixer base, and the adjacent lower edge of the walls of the base. This narrow air gap extends completely around the mixer base, interrupted at only a few points (shown as four) by rubber feet 159 which serve both to mount the bed and also to mount the housing of the mixer base. As shown in FIGS. 2 and 5, the inner side and end walls of the mixer base housing are fashioned with curved ribs 160, under which the rubber feet 159 are fastened as by threaded bolts 161 or the like. The bed 40 is notched, as at 162, to embrace the rubber feet 159 in the region of a peripheral groove, thus effectively locking the bed and feet together. These plurality of feet support the bed 40, and since they are mounted directly under the ribs formed on the inside of the walls of the mixer base casing, also support this casing.

I claim as my invention:

1. In a portable mixing device for foods and other substances having a base including a housing, an upstanding power head on said base and extending above said housing including stationary outer members and rotating inner members, the combination comprising, an annular mixing bowl having a central portion adapted to removably fit over said power head and be held by said stationary members of said power head in substantially concentric relation therewith, said mixing bowl also having a bottom, power driven impeller means removably connected to said rotating members of said power head and disposed within said bowl so as to rotate adjacent the bottom thereof and stir contents therein, and means carried by said power head providing a temperature controllable heat emitting support for the bowl including an annular electrical heating element carried in surrounding relation with said power head under said bowl, said heating element being in substantially coextensive engagement with the bottom of the bowl to support and heat said bowl and its contents, and a member fixed to said power head stationary members and extending laterally thereof beneath said annular heating element for supporting said annular heating element and a bowl received thereon.

2. In a portable mixing device for foods and other substances having a base including a housing, an upstanding power head on said base and extending above said housing including stationary outer members and rotating inner members, the combination comprising, an annular mixing bowl having a central portion adapted to removably fit over said power head and be held by said stationary members of said power head in substantially concentric relation therewith, said mixing bowl also having a bottom, power driven impeller means removably connected to said rotating members of said power head and disposed within said bowl so as to rotate adjacent the bottom thereof and stir contents therein, and means carried by said power head providing a temperature controllable heat emitting support for the bowl including an annular electrical heating element carried in surrounding relation with said power head under said bowl, said heating element being in substantially coextensive engagement with the bottom of the bowl to support and heat said bowl and its contents, a member fixed to said power head stationary members and extending laterally thereof beneath said annular heating element, and an annular baffle plate carried by said support member and supporting said heating element and a bowl received thereon, said housing having a substantially circular opening therein concentrically arranged with respect to said baffle plate and having a diameter greater than said heating element, said baffle plate being spaced at its outer periphery from the edge of said housing opening to provide an insulating gap.

3. In a portable mixing device for foods and other substances having a base including a housing, an upstanding power head on said base and extending above said housing including stationary outer members and rotating inner members, the combination comprising, a power unit in said housing on said base and connected to said rotating members, an annular mixing bowl having a central portion adapted to removably fit over said power head and be held by said stationary members of said power head in substantially concentric relation therewith, said mixing bowl also having a bottom, power driven impeller means removably connected to said rotating members of said power head and disposed within said bowl so as to rotate adjacent the bottom thereof and stir contents therein, means carried by said power head providing a temperature controllable heat emitting support for the bowl including an annular electrical heating element carried in surrounding relation with said power head under said bowl, said heating element being in substantially coextensive engagement with the bottom of the bowl to support and heat said bowl and its contents, a member fixed to said power head stationary members and extending laterally thereof beneath said annular heating element, an annular baffle plate carried by said support member and supporting said heating element and a bowl received thereon, said housing having a substantially circular opening therein concentrically arranged with respect to said baffle plate and having a diameter greater than said heating element, said baffle plate being spaced at its outer periphery from the edge of said housing opening to provide an insulating gap, and a fan in said housing operated by said power unit for moving air outwardly of said baffle plate on the underside thereof to said insulating gap.

4. In a portable mixing device for foods and other substances having a base including a housing, an upstanding power head on said base and extending above said housing including stationary outer members and rotating inner members, the combination comprising, an annular mixing bowl having a central portion adapted to removably fit over said power head and be held by said stationary members of said power head in substantially concentric relation therewith, said mixing bowl also having a bottom, power driven impeller means removably connected to said rotating members of said power head and disposed within said bowl so as to rotate adjacent the bottom thereof and stir contents therein, means carried by said power head providing a temperature controllable heat emitting support for the bowl including an annular electrical heating element carried in surrounding relation with said power head under said bowl, said heating element being in substantially coextensive engagement with the bottom of the bowl to support and heat said bowl and its contents, a member fixed to said power head stationary members and extending laterally thereof beneath said annular heating element for supporting said annular heating element and a bowl received thereon, and means for controlling the amount of heat emitted by said heating element.

5. In a portable mixing device for foods and other substances having a base including a housing, an upstanding power head on said base and extending above said housing including stationary outer members and rotating inner members, the combination comprising, an annular mixing bowl having a central portion adapted to removably fit over said power head and be held by said stationary members of said power head in substantially concentric relation therewith, said mixing bowl also having a bottom, power driven impeller means removably connected to said rotating members of said power head and disposed within said bowl so as to rotate adjacent the bottom thereof and stir contents therein, and means carried by said power head providing a temperature controllable heat emitting support for the bowl including an annular electrical heating element carried in surrounding relation with said power head under said bowl, said heating element being in substantially coextensive engagement with the bottom of the bowl to support and heat said bowl and its contents, a support member fixed to said power head and extending laterally thereof beneath said heating element, an annular baffle plate between said support member and said heating element, and a plurality of circumferentially spaced insulating buttons projecting upwardly from said support member and carrying both said baffle plate and said heating element, said buttons being arranged to project above said baffle plate and each having a vertical bore, said annular heating element resting on said insulating buttons and having a plurality of circumferentially spaced mounting pins on the underside of said element adapted to be received in said bores therein.

6. In a portable mixing device for foods and other substances having a base including a housing, an upstanding power head on said base and extending above said housing through a substantially circular opening therein including stationary outer members and rotating inner members, the combination comprising, an annular mixing bowl having a central portion adapted to removably fit over said power head and be held by said stationary members of said power head in substantially concentric relation therewith, said mixing bowl also having a bottom, power driven impeller means removably connected to said rotating members of said power head and disposed within said bowl so as to rotate adjacent the bottom thereof and stir contents therein, and means carried by said power head within said housing opening providing a temperature controllable heat emitting support for the bowl including an annular electrical heating element carried in surrounding relation with said power head under said bowl, said heating element being in substantially coextensive engagement with the bottom of the bowl to support and heat said bowl and its contents, a support member fixed to said power head and extending laterally thereof, a plurality of buttons of insulating material projecting upwardly from said support member and supporting said annular heating element, and an annular troughed baffle plate between said heating element and said support member spaced at its periphery from the edge of said housing opening and reflecting heat upwardly away from the latter and said support member toward a mixing bowl resting on said heating element.

References Cited in the file of this patent
UNITED STATES PATENTS

| | | |
|---|---|---|
| 2,097,825 | Wolcott | Nov. 2, 1937 |
| 2,513,254 | Savage et al. | June 27, 1950 |
| 2,605,382 | Kircher et al. | July 29, 1952 |
| 2,625,642 | Davis | Jan. 13, 1953 |
| 2,638,329 | Weygand et al. | May 12, 1953 |
| 2,657,299 | McNairy | Oct. 27, 1953 |